March 10, 1931. H. COLOMB 1,795,362
STEP BEARING FOR WATCH MOVEMENTS
Filed Dec. 23, 1927 2 Sheets-Sheet 2
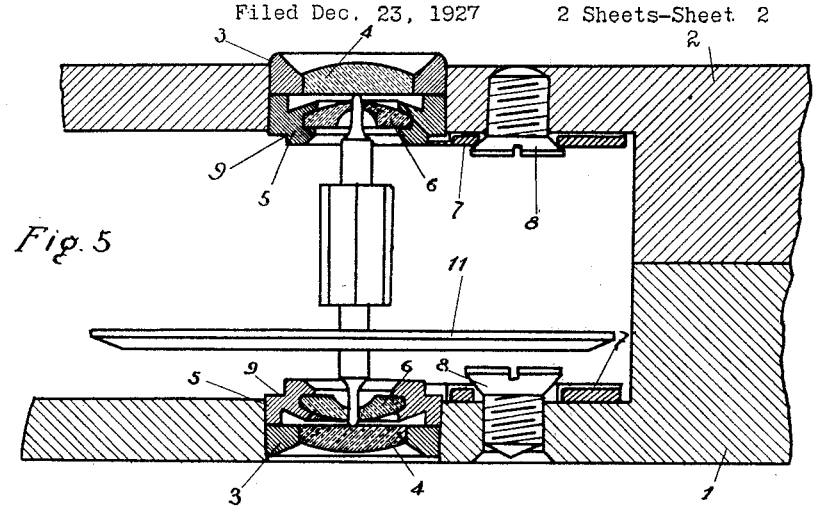
Fig. 5
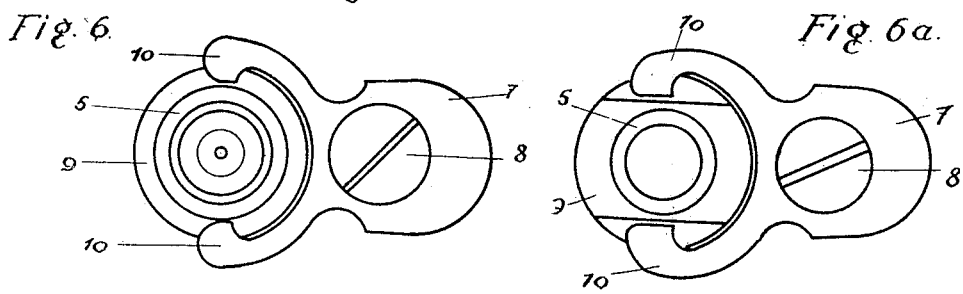
Fig. 6.  Fig. 6a.
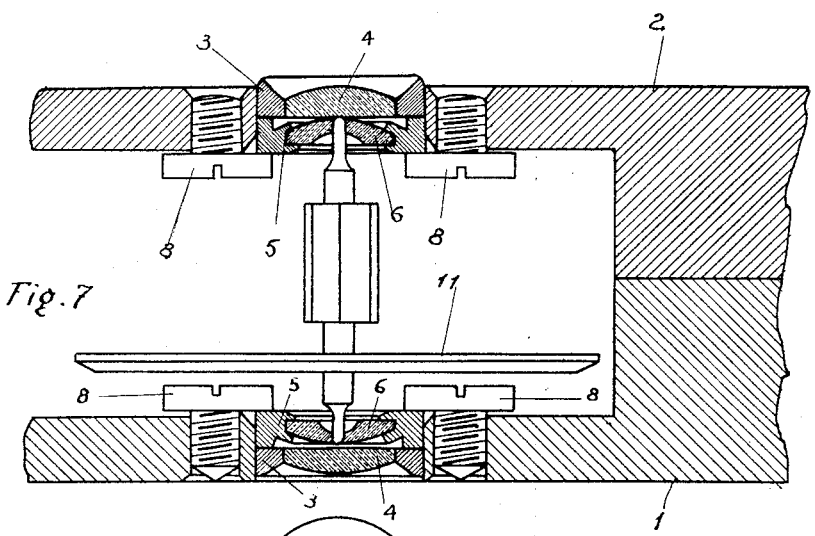
Fig. 7
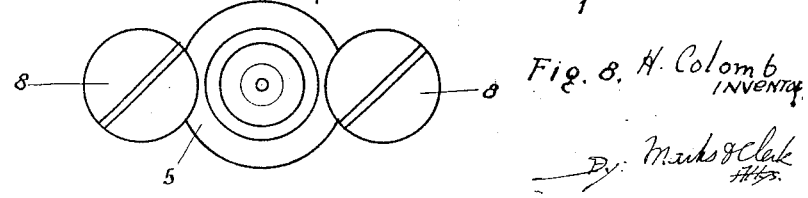
Fig. 8. H. Colomb
INVENTOR
By Marks & Clerk
ATTYS.

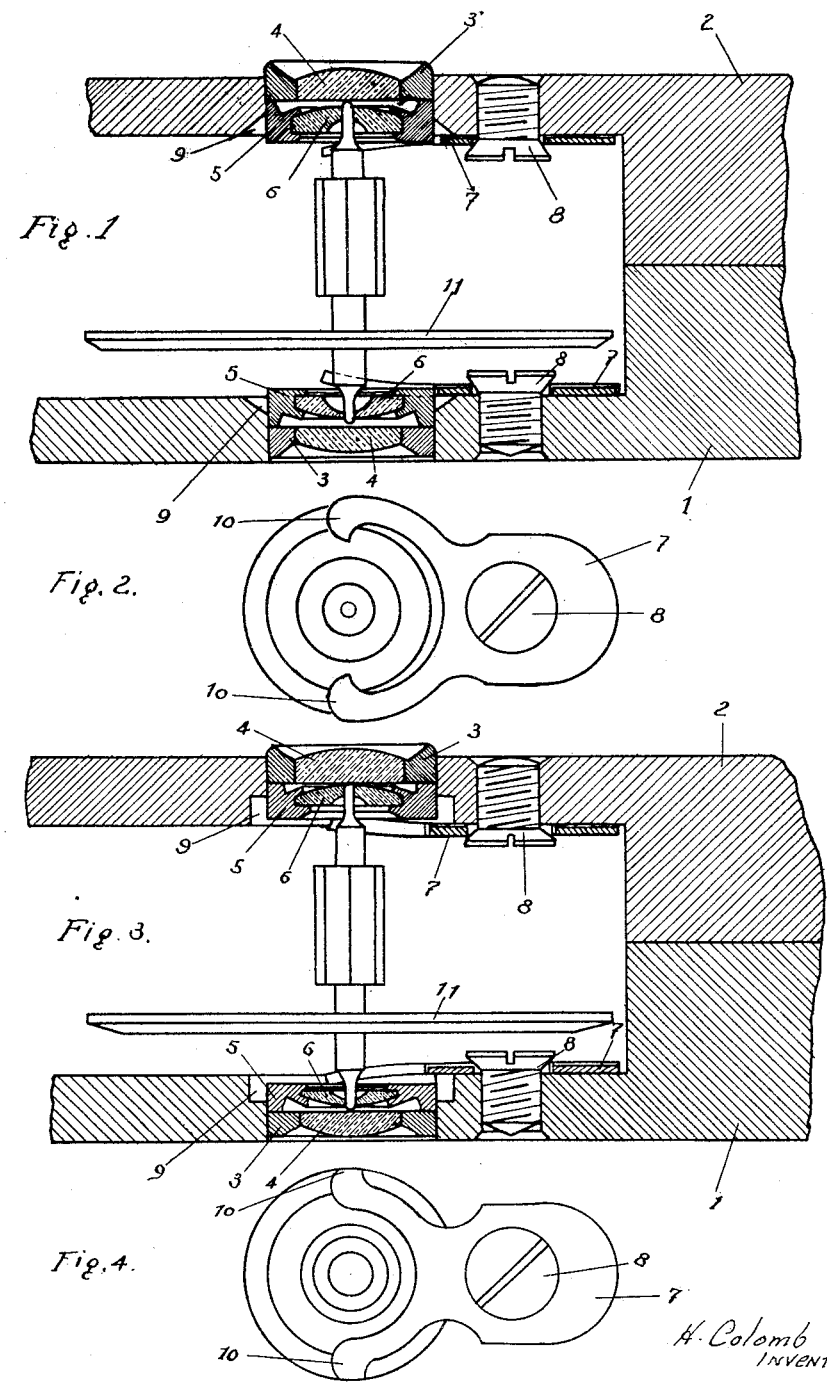

UNITED STATES PATENT OFFICE

HENRI COLOMB, OF TAVANNES, SWITZERLAND

STEP BEARING FOR WATCH MOVEMENTS

Application filed December 23, 1927, Serial No. 242,240, and in Switzerland January 19, 1927.

Heretofore two kinds of step bearings have been known in watch movements.

In the earlier kind of bearings generally used by Swiss manufactures, the metal of the movement plate and of the bridges constituted the setting of the hole stone while the cap-stone was held in a special cap-stone-plate. An exception made only the index disk which itself formed a kind of cap-plate and generally was fixed to the balance cock. These plates were sunk within the plate or the bridge and fixed by means of one or two screws.

The second kind of bearings, called the American, is mostly used in the United States and comprises a bush with a hole-stone sunk without play into a shouldered hole of the plate and a bush with a cap-stone held fast upon the same by means of two screws.

Both of these bearings show the defect that a changing of the height of a wheel is only possible by shortening one or both axle pins or by reducing the thickness of the feet of the bridges unless means are employed which a high-principled watch-maker would refuse. Besides this by employing such cap-stone-plates the obtaining of a pleasing design in the arrangement of the work is rendered difficult.

Furthermore, owing to the small thickness of metal left in the plate the necessity arises very often to employ only very thin screws for fastening the cap plate the thread of which screws is easily spoiled.

In the kind of bearings with cap-stone-plate the plate fixed to the bridge and generally made of steel assumes the shape of the bridge and must also possess the same angle. This angle after being hardened has to be polished and the setting of the stone in steel, the hardening, the coloring, the polishing of the lodging for the stone, the fitting in of the plate and the polishing of its angle and its surface render this kind of bearings rather costly.

In the American kind of bearing the sinking of the screw heads partly into the plate or bridge and partly into the bush of the cap-plate and at very little different depths in order to let the screw heads bear on said bush is also complicated and expensive.

It is the object of the present invention to propose a form of bearings having two bushes one for the cap-stone and the other for the hole-stone, both fitted into the same cylindrical hole and preferably rectified with a punch. The bush of the cap-stone is forced into its lodging while the other bush fitted into the same hole without any lateral play is held down on the first by suitable means.

Five working examples of the object of the invention are represented in the hereto annexed drawings in Figures 1 to 8.

Figures 1, 3, 5 and 7 are axial sections of the two axle bearings in plates and bridges of four working forms and Figures 2, 4, 6 and 8 are corresponding partial plan views, while Figure 6a is a plan view of a fifth working form. Like numerals of reference in the different figures indicate like parts. The plates are marked with 1 and the bridges with 2.

In the first working form according to Figs. 1 and 2 each bearing comprises a bush 3 with a cap-stone 4 against which is bearing the axle pin of the wheel 11. This bush is forced into the cylindrical hole provided for it and exactly at the height depending on the wheel. This height as is known varies according to the allowances of watch makers, but the bush can be put at any desirable height into the plate and into the bridge.

The bush 5 of the hole-stone 6 reposes on the first bush 3 and is lodged without lateral play within the cylindrical hole already partly occupied by said first bush.

The contact between the two bushes is assured by a spring 7 fixed by a screw 8. This spring shown separately in Fig. 2 has two prongs bearing on the bush 5. For this reason the bush projects over the surface of the plate or the bridge. Owing to the shape given to the prongs of spring 7 as shown in Fig. 2 these prongs apply closely to the bush 5. Cut-outs 9 are made in plate and bridge for giving the possibility to grip the bushes with pincers in order to remove the same if needed.

In the working form according to Figs. 3 and 4 there are turned sinkings 9 instead of cut-outs. The prongs 10 of the springs 7 are extended into these sinkings. Also this arrangement affords an automatic applying of the spring to the bush if the springs have received a suitable bend.

In the working form of Figs. 5 and 6 the bush 5 possesses a turned recess 9 the surface of which projects over the surface of the plate or bridge. This arrangement allows a secure adjustment of the spring 7 and prevents the bush from getting out of its lodging.

The Fig. 6a represents another form having recessed parallel cut-outs.

In the working form of Figs. 7 and 8, the screw heads 8 are the means for fixing the bushes of the hole-stones on the bushes of the cap-stone.

In all these working forms the bush of the cap-stone is forced into the cylindrical lodging of the plate and the bridge while the bush of the hole-stone is placed without lateral play thereupon so that it can be easily removed, if required. But the inverse could also be to wit that the bush of the hole-stone be forced into the hole and that the bush of the cap-stone be held fast thereon by suitable means.

It must also be noted that in the one case as in the other a drilled bush or a cap-bush could replace the hole stone-bush or the cap-stone-bush and such bearings could also be made in one piece for instance of hardened steel.

The described step-bearings show the following advantages:

1. A simplified manufacturing process even in the case where the number of parts should become greater than in the forms heretofore referred to.

2. The possibility of an exact centering of the two bushes by rectifying their outer surfaces according to the holes and by fitting the two bushes into the same cylindrical hole.

3. The facility to adjust according to need the height of the wheels to wit to adjust this height exactly after that of the cooperating wheel.

4. The possibility of determining easily and exactly the reciprocal distance of the two cap bushes and to put in the wheels in series that is to choose the suitable ones so that their height is at once the correct one without additional work.

5. The possibility of employing longer and stronger screws because here the whole thickness of the plate or bridge is left. This is not the case with the old form of bearings.

6. The facility of taking all easily apart owing to the flat clamping springs it being not necessary to unscrew the screws completely.

What I claim as new is:

1. In a step bearing for watch movements and in combination, a movement plate having a plain cylindrical perforation, a cap bush fitted tight but adjustably in an axial sense into the perforation, a drilled axle-pin bush fitted slidably into the same perforation and a forked flat spring fixed to the plate and bearing on the second bush so as to keep it in place.

2. In a step bearing for watch movements and in combination, a movement plate having a plain cylindrical perforation, a cap stone bush fitted tight but adjustably in an axial sense into the perforation, a hole stone bush fitted slidably into the same perforation and a forked flat spring fixed to the plate and bearing on the second bush so as to keep in place.

3. In a step bearing for watch movements and in combination, a movement plate and a bridge, both having plain cylindrical perforations coaxial to each other, cap stone bushes fitted tight but adjustably in an axial sense into both of said perforations, hole stone bushes fitted slidably into both perforations and forked springs fixed one to the plate and the other to the bridge and bearing on said hole stone bushes so as to keep the same in place.

In testimony whereof I affix my signature.

HENRI COLOMB.